United States Patent
Cajiga et al.

(10) Patent No.: US 11,585,478 B2
(45) Date of Patent: Feb. 21, 2023

(54) CASING SYSTEM AND METHOD FOR PIPELINE REINFORCEMENT AND REPAIR

(71) Applicants: Jose A. Cajiga, Miami, FL (US); Arturo Cajiga Villar, Miami, FL (US); Vicente Cajiga Villar, Miami, FL (US); Alexandra Cajiga, Miami, FL (US)

(72) Inventors: Jose A. Cajiga, Miami, FL (US); Arturo Cajiga Villar, Miami, FL (US); Vicente Cajiga Villar, Miami, FL (US); Alexandra Cajiga, Miami, FL (US)

(*) Notice: Subject to any disclaimer, the term of this patent is extended or adjusted under 35 U.S.C. 154(b) by 383 days.

(21) Appl. No.: 15/454,159

(22) Filed: Mar. 9, 2017

(65) Prior Publication Data

US 2017/0261146 A1    Sep. 14, 2017

Related U.S. Application Data

(60) Provisional application No. 62/305,605, filed on Mar. 9, 2016.

(51) Int. Cl.
| | |
|---|---|
| *F16L 55/175* | (2006.01) |
| *B29C 73/02* | (2006.01) |
| *F16L 55/179* | (2006.01) |
| *F16L 55/18* | (2006.01) |
| *B29K 63/00* | (2006.01) |
| *B29K 75/00* | (2006.01) |
| *B29L 23/00* | (2006.01) |

(52) U.S. Cl.
CPC .......... *F16L 55/175* (2013.01); *B29C 73/025* (2013.01); *F16L 55/179* (2013.01); *F16L 55/18* (2013.01); *B29K 2063/00* (2013.01); *B29K 2075/00* (2013.01); *B29L 2023/22* (2013.01)

(58) Field of Classification Search
CPC .... F16L 55/175; F16L 55/18; B29K 2063/00; B29L 2023/22
See application file for complete search history.

(56) References Cited

U.S. PATENT DOCUMENTS 3,467,141 A * 9/1969 Smith ................... F16L 55/175
                                                        138/97
3,938,774 A * 2/1976 Smith ................... F16L 55/175
                                                        249/90

(Continued)

OTHER PUBLICATIONS https://www.masterbond.com/techtips/optimizing-electrical-electronic-insulation-propesrties-epoxies Year is cited by Wayback machine (Year: 2012).*

(Continued)

*Primary Examiner* — Alison L Hindenlang
*Assistant Examiner* — Debjani Roy
(74) *Attorney, Agent, or Firm* — Grogan, Tuccillo & Vanderleeden, LLP

(57) ABSTRACT

A system for the repair or reinforcement of a pipeline includes a casing having a dimension to envelope a damaged portion of the pipeline, such that a space is defined between an inner surface of the casing and an outer periphery of the pipeline. An injection port is positioned along the casing and is in selective communication with the space. A cap assembly is frictionally attached to the casing and the pipeline, after which time an injectable material is selectively injected through the injection port until filling a substantial entirety of the space.

9 Claims, 9 Drawing Sheets

(56) References Cited

U.S. PATENT DOCUMENTS

| | | | | |
|---|---|---|---|---|
| 3,954,288 | A | | 5/1976 | Smith |
| 4,391,458 | A | * | 7/1983 | Blakeley ................ F16L 41/12 |
| | | | | 285/112 |
| 5,079,824 | A | | 1/1992 | Lopez |
| 5,560,511 | A | * | 10/1996 | McNerney ............ B65D 85/82 |
| | | | | 220/327 |
| 6,276,726 | B1 | * | 8/2001 | Daspit .................. F16L 55/172 |
| | | | | 285/379 |
| 2004/0129373 | A1 | * | 7/2004 | Nadarajah ............ F16L 55/168 |
| | | | | 156/94 |
| 2006/0065320 | A1 | * | 3/2006 | Borland ................ F16L 55/175 |
| | | | | 138/99 |
| 2008/0092972 | A1 | | 4/2008 | Boulet D'Auria et al. |
| 2008/0216938 | A1 | | 9/2008 | Rice |
| 2017/0261146 | A1 | | 9/2017 | Cajiga |

OTHER PUBLICATIONS

International Search Report dated Jun. 2, 2017 Based on Application No. PCT/US17/21513.
Corresponding PCT International Search Report and Written Opinion dated Aug. 10, 2021.

* cited by examiner

CASING SYSTEM AND METHOD FOR PIPELINE REINFORCEMENT AND REPAIR

CROSS-REFERENCE TO RELATED APPLICATIONS

This application claims the benefit of U.S. Provisional Application Ser. No. 62/305,605, filed on Mar. 9, 2016, which is hereby incorporated by reference herein in its entirety.

FIELD OF THE INVENTION

The present invention refers, generally, to a casing system used as a reinforcement and repair for pipelines, and more specially a casing system used as a reinforcement and repair for hydrocarbon conducting pipelines and its accessories like valves flanges or others. The present system and method includes a casing, connecting elements between the casing and the conducting pipeline, thereby forming an annular gap between the pipeline and the casing, penetrators or couplings in the body of the casing for the injection of a resin, and a seal and joining element installed through mechanical means between the main body of the casing with the pipeline.

BACKGROUND OF THE INVENTION

The invention belongs, generally, to the field of providing reinforcements for conducting pipelines, which may have suffered a thinning or lessening of the wall thickness as a result of corrosion caused by the environment, erosion and the mechanical means or have suffered mechanical damage caused in turn by one of these elements, or other factors.

As is known, conduction pipelines are mainly employed in the oil and petrochemical industry. These pipelines occasionally need to be preplaced or repaired due to a number of differing situations, including when a change of a section of the pipeline is necessary for replacing a damaged area, and/or when it is desired to provide a metallic casing in order to reinforce the pipeline.

As will be evident to one of ordinary skill, in the case of a need of making the above mentioned repairs, such as replacing a damaged zone of a pipeline/conduit, it is often necessary to leave out of service the conduit or pipeline during the repairs, resulting in severe economic damage and potential loss.

Indeed, known apparatuses and procedures for welding operating pipelines require very strict quality control, in the assembling and welding of the casing and of the joints of the casing and the pipeline together, all of this due to the evident risk entailed when welding over a pressurized pipeline, typically carrying hydrocarbon gases or liquids.

It is therefore the long felt need in the industry to carry out repairs of this kind that has made it necessary to develop non-intrusive systems in the conducting pipeline to avoid unnecessary risks during repairs, and to increase the overall structural integrity of the repaired pipeline.

It is known by those skilled in the art to repair conducting ducts or pipelines by providing a metallic casing, as an envelope of the pipeline, which performs a structural mechanical reinforcement in the damaged section. As is known in such systems, however, it is required that the envelope/casing be in direct contact with all the body of the pipeline, as the casing is itself welded to the body of the pipeline.

Known casing type repairs are typically carried out through the use of two semicircular baking plate/envelope sections, which wrap the pipeline and are welded to the same in two longitudinal welds (to the axis of the tube), which join the two sections of the envelope and the pipeline together and two or more radial welds (to the axis of the pipeline) which join the envelope and the tube together.

Of course, the details of the welds and the processes involved are known, such as types of bevel, dimensions and procedures for applying weld which are within the rule of ASME code Section IV, for the type of materials which are employed in the repairs.

As mentioned previously, in known casing-repair systems, there exists the requirement that the repair casing or envelope must be in direct contact with the pipeline, and therefore, that the inner diameter and profile of the enveloping be substantially the same as the outer diameter and profile of the pipeline which is going to be repaired. This requirement involves the following limitations and the following disadvantages:

1. In the great majority of the cases the pipeline to be repaired presents some mechanical damage (deformation) or scour whereby depending of the size of the damage the use of the repair mechanism (i.e., casing/envelope) is limited since it is very difficult to adjust the enveloping so that it is totally and completely in contact with the pipeline;
2. An evident disadvantage is derived from the fact that the peripheral weldings of the duct-casing joints that are required for the installation, always weld the enveloping casing to the pipeline itself. As will be appreciated, there is a certain degree of danger associated with welding the repair casing/envelope to the pipeline or conduit, given the nature of the gases and liquids typically conveyed by such pipelines. Likewise, another evident disadvantage is that it is necessary to reduce the pressure of operation of the pipeline during the whole process of welding application for placing the casing; and
3. An additional disadvantage is that by making peripheral welding bindings between the casing and the conducting pipeline when the pipelines are submerged require equipment for applying hyperbaric welding and sophisticated procedures for completing the welding.

Due to the aforementioned disadvantages the invention has proposes to provide a casing system as a reinforcement or repair for pipelines which overcomes the disadvantages of known systems, while providing evident and additional economic and technical advantages.

SUMMARY OF THE INVENTION

Thus, one important aspect of the invention is to have a repair system (of a permanent type) of conduits/pipelines, whether terrestrial or subaquatic, with great advantages over the already known repairing systems, mentioned previously.

The invention generally includes a casing for pipelines of any diameter and thickness, with the object of reinforcing them. This is achieved through an assembly of carbon steel rolled casings or of any type of steel (equal or compatible to the specification of the pipeline to be repaired) as an envelope covering the pipeline but leaving an annular gap between the pipeline and the casing in which after being installed, the casing is formed in between the pipeline by means of welding and is provided in the ends of the casing, with mechanical heads which are installed by means of screws to the casing and provide the seal which is required between the casing and the conducting tube, these heads are bipartite and have a system for tightening the head against the conducting pipeline to avoid any possible displacement, then it is injected a resin produced from polymers, copolymers or any type, which have the required mechanical properties depending on the operation pressure and the particular characteristics of the pipeline, to achieve that the assembly is 100% integrated to the pipeline and the casing, forming a single compound assembly for the tubing, the resin and the casing.

This casing system is not limited to be used only in the lineal parts of the duct, but it can be used in the changes of geometry of the pipeline, for example and without being limited to, in the elbows of any radius and dimensions, in the intersections between the "T" and "Y" type pipelines, etc. Pursuing and complying in all cases with the same main objectives of the invention.

This casing system is not limited to be used only to reinforce a pipeline itself, but can also be employed to encapsulate a previous temporary bolted clam installed over the damage on the pipe, or to be installed over a damage Valve or flange that is part of the pipe line. In sum, the arrangement of the casing can occur over any portion of the pipeline, including the pipeline itself, or those portions of the pipeline that have been repaired previously, or those sections that include valves, flanges or other structural constructs.

Therefore, it is reiterated that the invention consists of a casing for pipelines of any diameter, thickness and length, with the object of reinforcing them, and for restituting or even overcoming their original design conditions.

As will become appreciated by review of the specification and drawings, the repair envelope or casing of the present invention can be formed by one, two or more semicircular sections depending on the length and place of the section of the pipeline to be repaired, as well as the access and the ease for its assembly. It should be noted, however, that the outer periphery of the casings may be of any shape of configuration without departing from the broader aspects of the present invention. Moreover, in any of the embodiment of the present invention, only in the ends of the casing will be screwed the heads which serve as union between the casing and the pipeline. The geometry of this assembly can be varied depending of the conditions and characteristics of the pipeline to be repaired.

In one embodiment, the casing has one, two or more couplings for the injecting of resin in the annular gap, and these can be located in any part of the body of the casing depending on each particular case, since the conditions of the injection change if the pipeline is placed in a vertical, horizontal or inclined position, or simply for the easy access to the joints.

One important aspect of the present is the use in the annular space of a resin made of polymers, copolymers or of any type, with the specific mechanical and physical properties for the kind of repair and the particular characteristics of the pipelines.

The resin has the object of serving as a mean for integrating a pipeline to the casing as a single assembly, resulting from this a section comprised by the pipeline, the resin and the casing, obtaining in this form the assembly thus formed, a greater resistance that the resistance of the original design of the pipeline. Besides, the injected resin in the annular space has a second main function and can have different physical properties such as being insulating, such as having a high resistance to abrasion, etc. being this an important possibility to resolve or attack the problem that originally caused damage to the pipeline.

Thus, the advantages of the present invention over the systems and methods of the previous art are evident.

In particular, the present system and method enables repairs of a permanent type to pipelines in their lineal parts, and in their changes of geometry, without having to take them out of operation with the great economical advantage that this represents.

Moreover, the present invention has better feasibility of utilization for repairing the pipelines due to the fact that the casing is not in initial structural contact with the pipeline which is to be repaired, which is not possible with the traditional enveloping method.

As previously mentioned, the present invention also has the feasibility to be installed over a bolted clamp or valve, that is part of the pipeline, due to the fact that the casing can be installed to encapsulate any member and the resin injected in the annular space, regardless of the contour or other mechanical adaptations located on the pipeline itself.

As will be further appreciated, the invention ensures a substantially 100% contact between the damaged pipeline and the casing by means of a resin injected in the annular ring formed between the outer periphery of the pipeline and the inner surface of the casing/envelope. Thus, even if the pipeline has deformations or mechanical damages or perforations on its external wall due to corrosion or a damage valve or flange installed on the pipe that need to be encapsulated or other causes, a continuous and complete medium is produced between the between the outer periphery of the pipeline and the inner surface of the casing/envelope.

Thus, and through the proposed system, it is possible to radically reduce the risk of welding directly on the outer periphery of the pipeline itself while the pipeline is in operation, since with the present system and method it is only required to make the welding on the body of the casing for assembling it around the pipeline, and then the use of a screwed head as the bonding and seal means between the casing and the conducting pipeline.

Still further, the present system and method does not require that the operation pressure of the pipeline be lowered to carry out the assembly between the casing and the conductive pipeline.

The proposed system permits also the time reduction of the installation of the casing over the pipeline, and the casing system can be installed underwater without having to carry out welding union between the casing and the conducting pipeline to fix the casing to the pipeline.

The proposed system permits also to be installed over a provisional bolted clamp installed on the pipe used to stop a leak or over a valve assemble that needs to be encapsulated to stop a leak. Or, to encapsulate a flange or any other accessories that may be part of the pipeline and need to be repaired.

It is noted that with this composition it is opened a great and important spectrum of possibilities for repairing any pipeline in operation, counterattacking the problem which originated the failure. Indeed, the present system and method of making repairs to pipelines/conduits has the added benefit of often making those portions of the pipeline that have been repaired, stronger, as compared to the non-repaired portions of the pipeline.

BRIEF DESCRIPTION OF THE DRAWINGS

The invention will be better understood making reference to the drawings attached, in which.

DETAILED DESCRIPTION OF THE INVENTION

Making now reference in particular to the previously mentioned figures, the present invention will be now described in detail.

Figure 1:
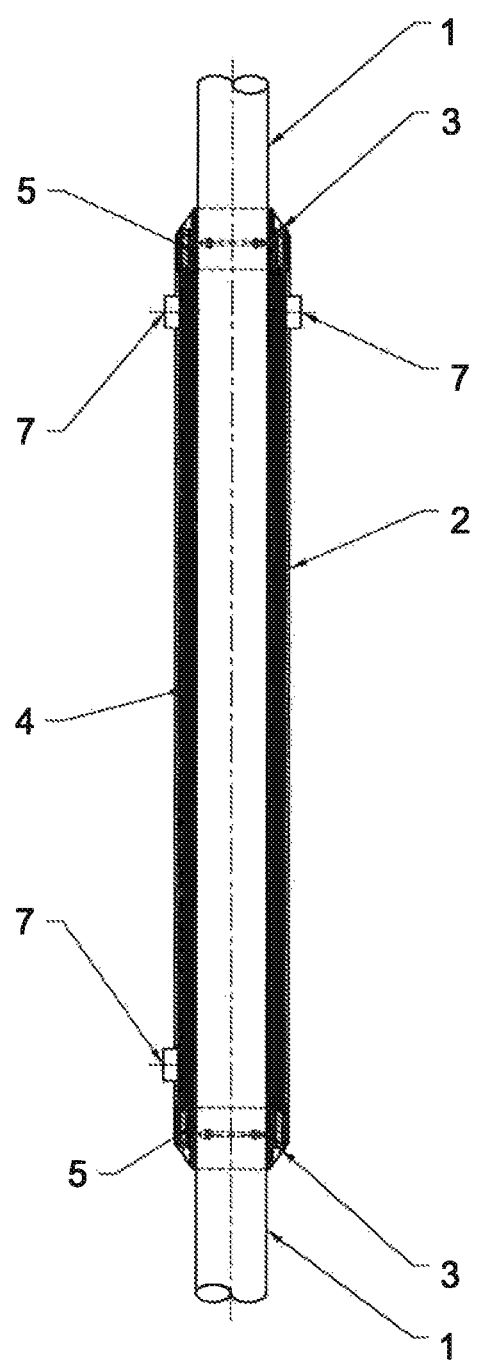
FIG. 1 is a lateral view and a longitudinal section showing in a schematic form the pipeline, the resin and the casing or enveloping.

In FIG. 1 it is illustrated a longitudinal section view of the pipeline repair and reinforcement system, according to one embodiment of the present invention. As shown in FIG. 1, a conducting pipeline/conduit 1 is intended for repair with the envelope/casing 2, the mechanical union element head 3 and the O-ring type seal 5 which is housed between the mechanical union element and the conducting pipeline.

It will be readily appreciated that after the mounting of the mechanical head 3, and in connection with the placement of the o-ring seal 5, the annular space formed between the interior surface of the casing 2 and the exterior peripheral wall of the conducting pipeline will be effectively sealed.

Once the casing 2 has surrounded the damaged portion of the pipeline, and the head, or cap, 3 is fitted and secured thereto, the annular space formed between the interior surface of the casing 2 and the exterior peripheral wall of the conducting pipeline 1 is injected and filled with a suitable injectable material/resin via the penetrators or couplings/ports 7. It should be noted that the number and the position of injection ports 7 is variable and they may be situated in any part of the body of the casing 2, in dependence upon the geometry and necessity of the pipeline to be repaired/replaced. Once the cap 5 has been so positioned, FIG. 2 also illustrates the welding of union 6 which permits the integration of the casing 2.

As will be appreciated, the specific resin chosen will be selected on the composition and environmental conditions of the pipeline to be repaired, without departing from the broader aspects of the present invention. Moreover, by filling in the annular space between the pipeline section to be repaired and the outer casing disposed therearound, the present invention ensures that the entirety of the inner surface of the casing assuredly contacts, via the injected resin, the entirety of the outer periphery of the pipeline in the area that is to be repaired.

As discussed previously, known pipeline repairs involve the necessity of welding directly on the pipeline itself, with all the inherent dangers associated with taking such actions on a vessel that is likely conducting hydrocarbon gas or liquid. It is therefore one important aspect of the present invention that a combination of the injected resin, and the mechanical caps, effectively avoids the potentially concerning pipeline welding that is a hallmark of pipeline repair systems known a priori.

Moreover, and as will be appreciated, known pipeline repairs have no way of ensuring that the entirety of the outer periphery of the damaged pipeline, or the periphery of any element, valve, flange or others installed in the area to be repaired, will be in contact with the repairing casing. Indeed, as the outer periphery of the pipeline is effectively never uniform in contour or diameter, it is axiomatic that known pipeline repair systems cannot provide supportive contact to the entirety of the outer periphery of the pipeline via the repairing shell of the casing.

Thus, it is another important aspect of the present invention to provide a means and method for the supportive nature of the casing 2 to be imparted to the entirety of the damaged portion of the pipeline. The present invention accomplishes this by injecting the resin, via ports 7, into the substantially annular space formed between the casing and the pipeline. In this manner, and regardless of changes in contour or diameter, the present invention ensures that the damaged portion of the pipeline contacts and enjoys the structural support of the casing over its entire outer periphery/surface.

Figure 2:
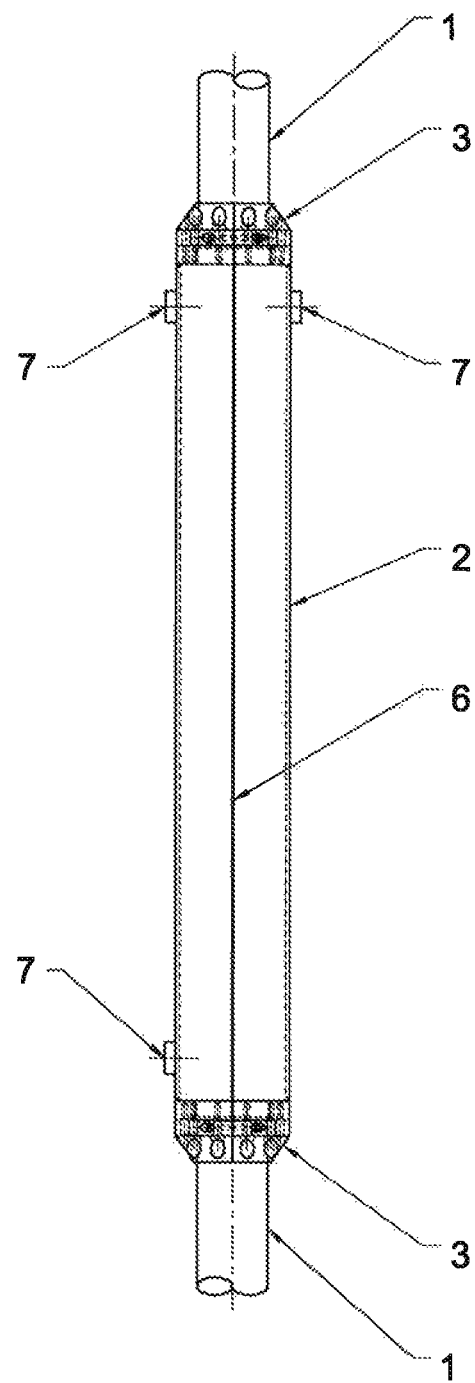
FIG. 2 is a lateral view of the casing and of the pipeline section.

In FIG. 2, which is a longitudinal lateral view, it is shown the outer appearance of casing 2 and of the pipeline 1. As shown, the main body of the casing 2 is preferably in two sections, but may be of any number without departing from the broader aspects of the present invention. Indeed, and although not illustrated in FIG. 2, the present invention not only suggests the use of a two-piece casing that is to be welded to itself along dual axial lines, apart from the outer surface of the pipeline, but equally contemplates a since piece casing. With a single-piece casing, the casing is 'slipped' over the affected portion of the pipeline via a single, axial split line opening, and after suitable peripheral constriction, the single seam is welded in the same nature as when a two-piece casing is utilized.

Turning again to FIG. 2, it can be appreciated the joining element 3 between the casing 2 and the pipeline 1, the ports 7 for the injection of resin 4, as well as the joining welding 6 for integrating or forming the casing around the pipeline.

Figure 3:
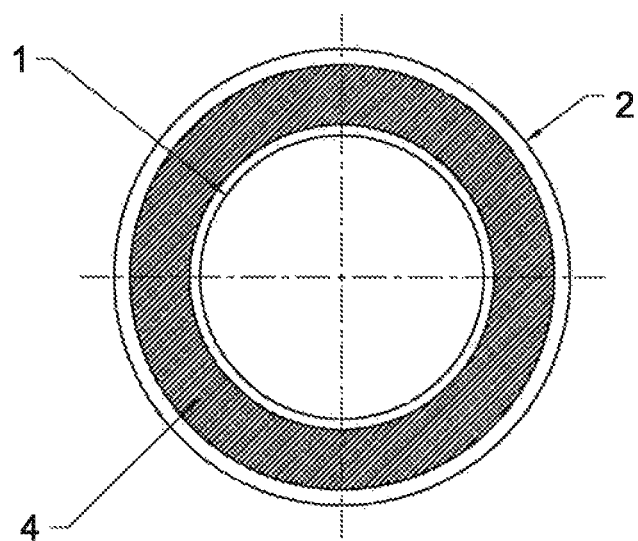
FIG. 3 is a top view and cross section of the section formed by the pipeline, the resin and the enveloping of the casing.

For its part, FIG. 3 is a cross section top view of the middle area of the casing. FIG. 3 therefore illustrates the three elements which essentially form a repaired pipeline, which are the pipeline 1, the resin 4, which is located in the space between the casing and the pipeline 1, and the main body of the casing 2.

Figure 4:
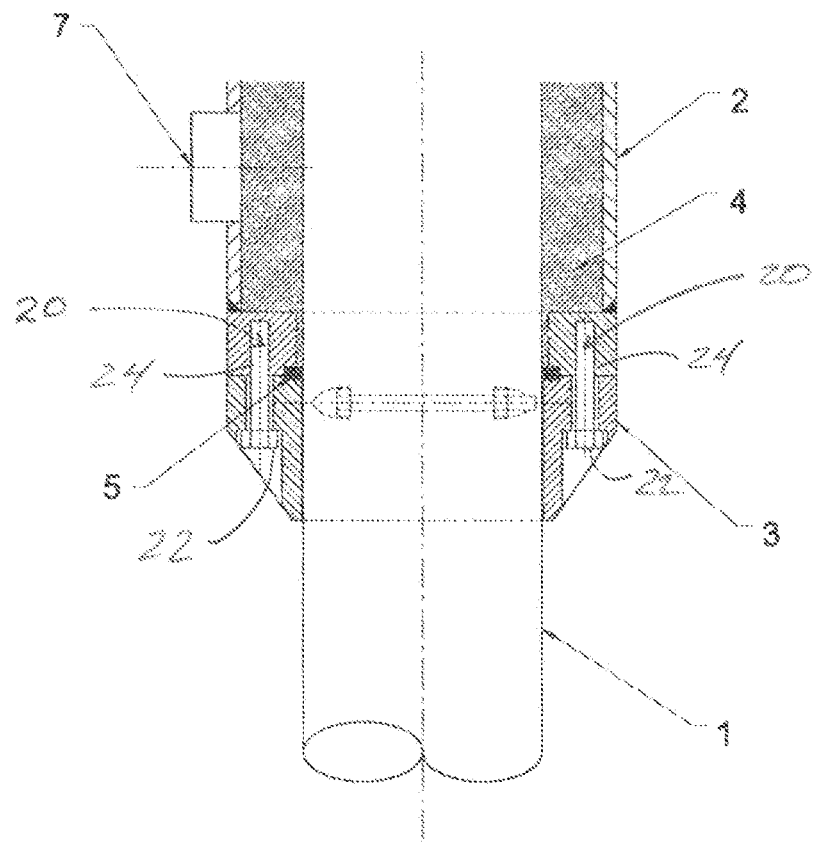
FIG. 4 is a lateral and a section of the mechanical union element between the casing and the pipeline as well as a lateral view of the penetrators for the injection of the resin.

FIG. 4 shows one embodiment of the invention of how the casing 2 can be formed by two or more semicircular sections enveloping the pipeline 1.

Figure 5:
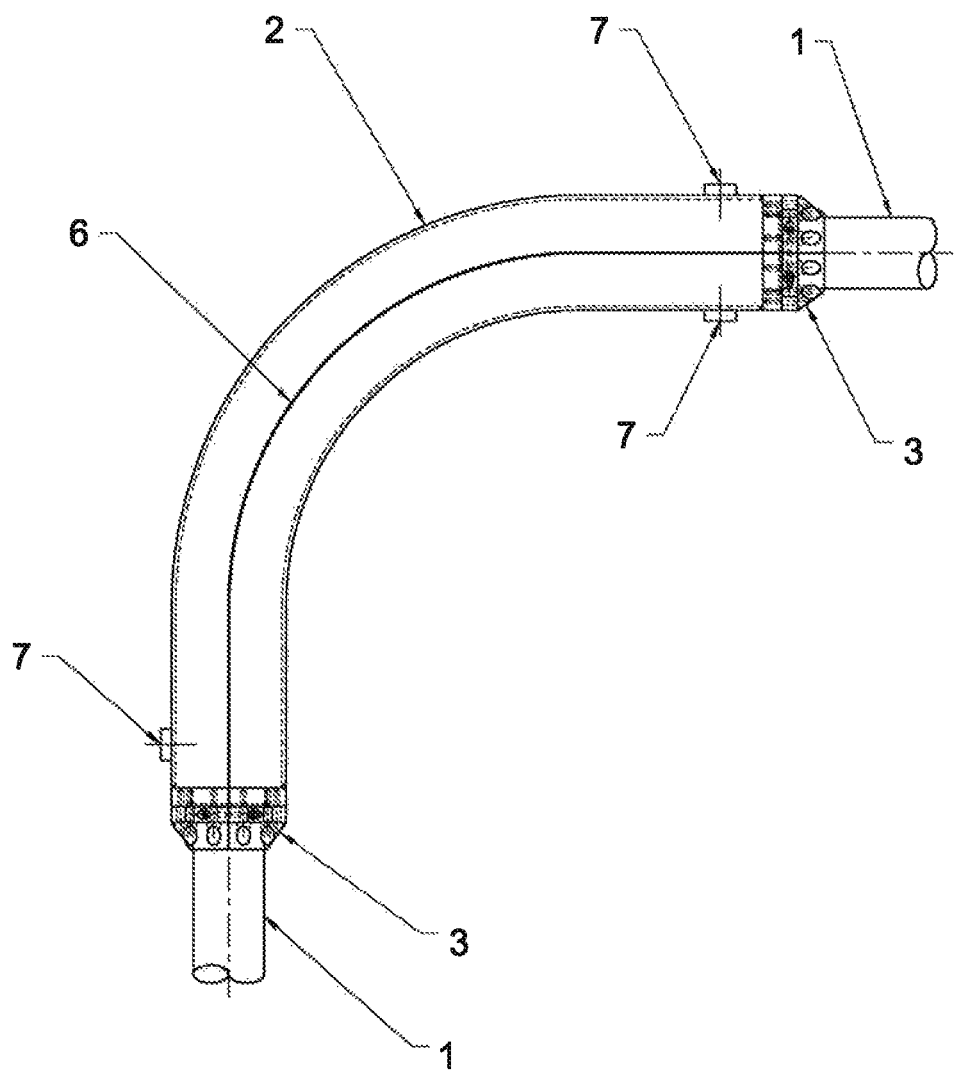
FIG. 5 is a top view of the casing with elbows in the pipelines.

FIG. 5 shows the union elements between the casing 2 and the pipeline 1, the couplings/ports 7, the welding 6 between the main body of the casing 2 and the welded base as an integrated part of the casing for receiving the mechanical union element/cap 3 which, preferably, is installed with the use of screws.

Figure 6:
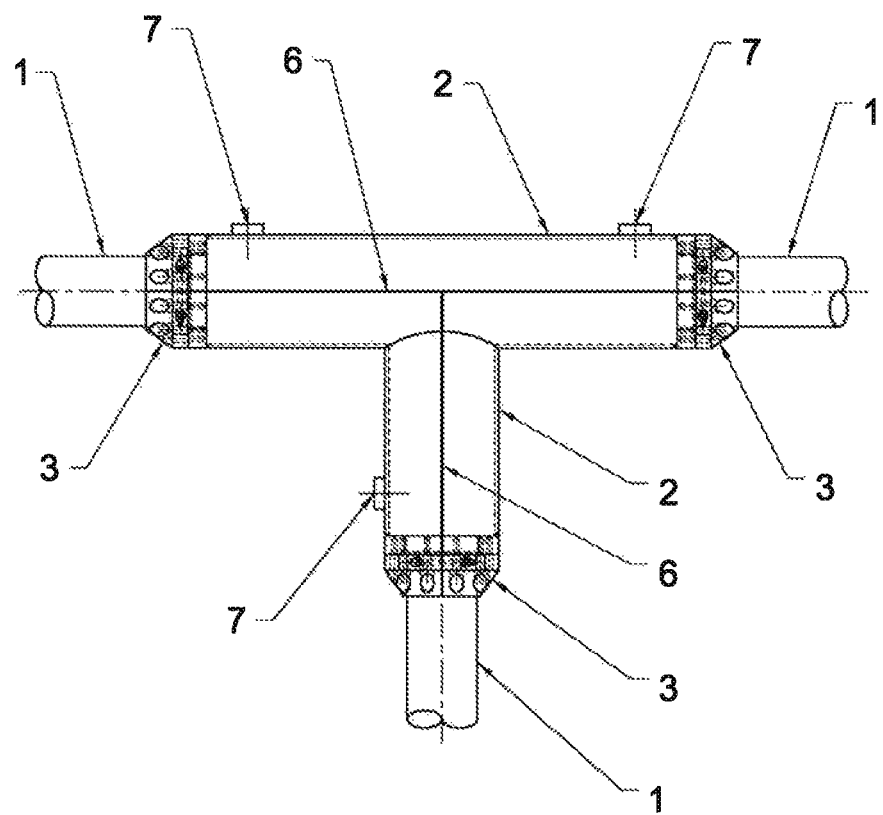
FIG. 6 is a top view of the "T" casing on the pipelines.

FIGS. 6 illustrate the use of the present invention, with pipelines/casings having "T", or angled, configurations.

Figure 7:
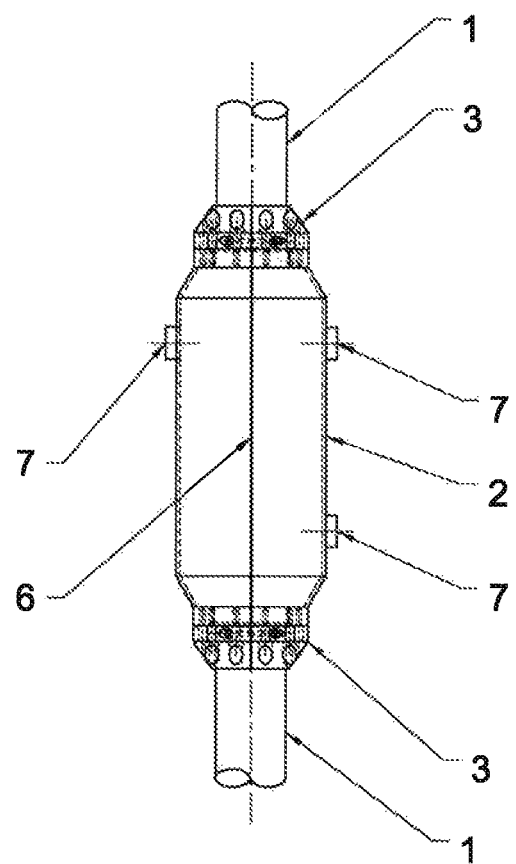
FIG. 7 is a lateral view of the casing and the pipeline section.
Figure 8:
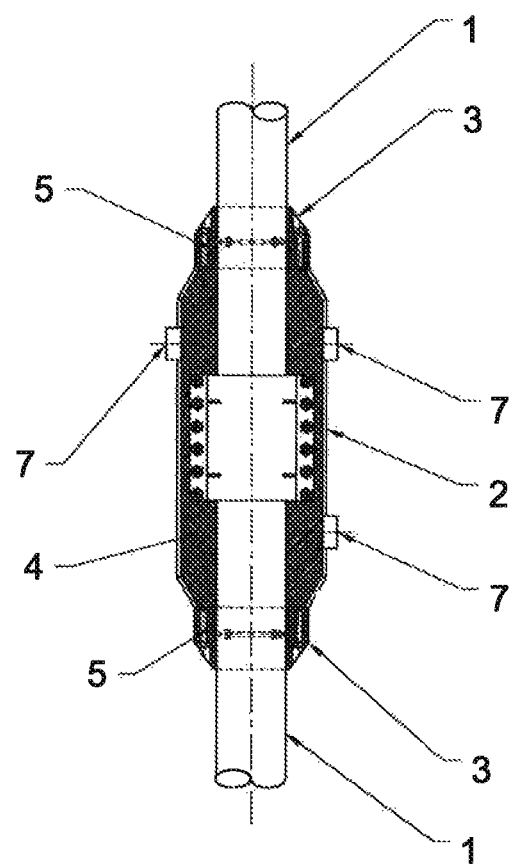
FIG. 8 is a lateral view and longitudinal cross section showing in a schematic form the pipe line, the bolted clamp, the resin, the injection ports and the casing or enveloping.
Figure 9:
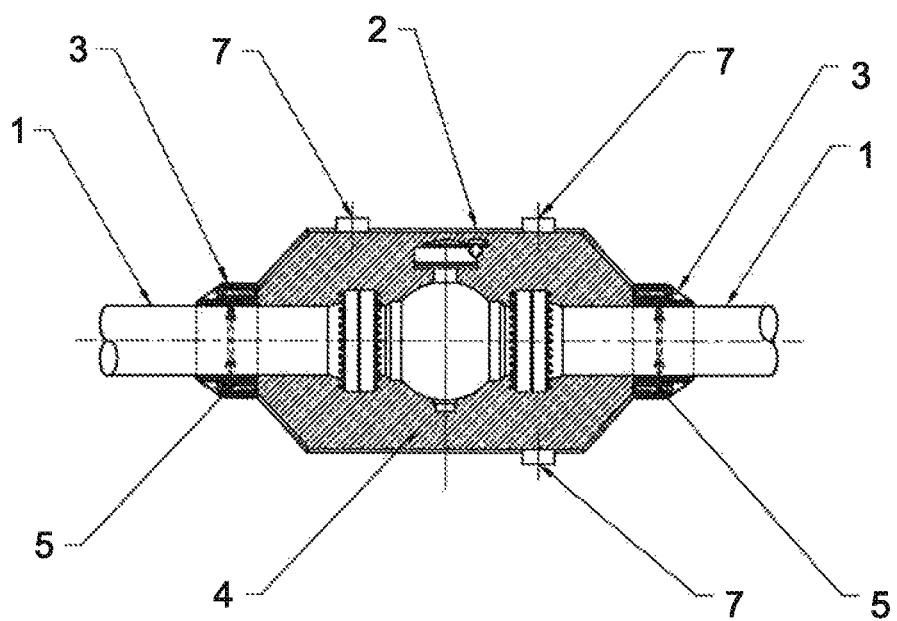
FIG. 9 is a lateral view and longitudinal cross section showing in a schematic form the pipeline, a valve, the resin and the casing or enveloping.

In particular, FIG. 7 illustrates the use of the present invention installed over a bolted clamp previously installed on the pipe, shows one embodiment of the invention of how casing 2 can be shape to allow encapsulate a element, valve, flange, that is part of the pipeline It is also noted that in the vertical (or horizontal) position it is oftentimes required to provide a siphoning action at the time when the injection of the injectable material is accomplished. That is, due to the fact that repairs may occur underwater, it is necessary to effect a siphon to guarantee the total saturation of the annular space between the casing and the tube, with the injected resin material.

An alternative embodiment and particular use of the present invention involves the repair/reinforcement of ascending pipelines of marine platforms. Such environments are particularly of concern as ascending pipelines, typically carrying gas or liquid hydrocarbons, are subject to swells and tides and therefore suffer a high grade of corrosion due to the abrasive effect of these tides. Moreover, the content of chlorides and the high grade of oxygenation of the marine water in such areas, as well as the constant spray of salts in the non-submerged splatter area of the pipeline, can accelerate corrosion of such ascending pipelines.

Still further, when a pipeline works at a temperature of about 50 degree centigrade or higher, the corrosive effects of the surrounding environment are highly increased, generating with this a phenomenon called accelerated corrosion.

Thus, one important application of the present invention is in the areas and conditions of just such aggressive environments, including when the pipelines are operated in the range of temperature of 0 degrees centigrade to 200 grades centigrade.

When working in such hostile environments and at such extreme temperatures, both internally with respect to the pipeline itself, as well as compared to the surrounding environment, the present system and method provide many advantages over known repair and reinforcement systems, especially in relation to ascending pipelines.

In particular, the present system and method will structurally reinforce any damaged portion of such an ascending pipeline, working as only one assembly. Moreover, the injected resin, or other isolating material, effectively and thermally separates the casing from the conducting pipeline, obtaining with this that the outer wall of the casing works at a temperature much lower than that of the pipeline.

The present invention also and equally contemplates electrically insolating a damaged pipeline through the use of dielectric materials for manufacturing the screwable head of union between the casing and the pipeline, effectively making the main body of the casing electrically isolated from the pipeline. In this manner, it is possible to ensure that materials can be selected with different cathode potentials for making the body of the casing and not generating a galvanic potential between the casing and the pipeline.

As will therefore be appreciated by review of the foregoing comments and associated drawings figures, the present invention utilizes a casing, preferably with the same general specifications as the pipeline to be repaired, of variable length and positioned so as to evidence an annular gap between the pipeline and the casing, and including a screwed head system at the ends of the casing, which serve for making a seal and sealing the annular gap between the pipeline and the casing and into which a resin or another material based on polymers, copolymers, or any type of material is injected.

Integrated as such in a single assembly, the pipeline and the casing thus obtained evidence very high structural mechanical properties as compared to that of the pipeline by itself, increasing the working pressure capacity of the pipeline in this section.

Moreover, the present invention can effectively act as and produce a thermic isolation between the pipeline and the outer wall of the casing which is going to be in direct contact with the environment. As a result, the working temperatures are radically lowered and the corrosion rates are lowered in the system as a whole, besides permitting to carry out the work out of the outer coating in a suitable form.

As will be appreciated by one of ordinary skill, the present invention offers a range of benefits, including but not limited to:

Accommodating the repair/reinforcement of a pipeline having any specification and variations in dimension, with or without bezels for welding at the ends;

Existing pipeline sections can be retrofitted to enjoy superior nominal dimensions via the applied casing, or during initial manufacture of the pipeline it can be made also as a concentric rolled section to the conducting pipeline as an enveloping casing and with any dimension;

The utilization of screwable / torsion caps as a joining means between the conducting pipeline and the enveloping casing. While a screw-based system has been primarily described, it will be readily appreciated that any constricting or friction-based securing methodology may be employed to secure the cap and associated seal to both the casing and pipeline, without departing from the broader aspects of the present invention. Indeed, as best shown in FIG. 4, bolts 20 are employed as anchoring elements, each having a head portion 22 and a shaft portion 24, with the entirety of the axially aligned shaft portion 22 being embedded and therefore protected, when the cap is attached to the casing;

Because of the substantially annular space formed between the casing and pipeline, the present invention enables an unending choice of resins that may be injected therein, including those manufactured from polymers, copolymers or any material which is insolating or with other physical properties and which has or not mechanical properties for complying a structural function, without reservation;

One or more injection ports in the enveloping casing for the efficient injection of the resin or insulating material;

An outer coating of the casing may be applied, which can be of any type. That can be among others without limitation to: the use of epoxy resins, elastomers based on natural or synthetic rubber, polyurethane elastomers, anticorrosive paints, etc.;

Lastly it is necessary to note as it has been previously indicated that the geometry of union/cap 3 can be varied according to the needs of the design which the case requires.

Although the invention has been described in relation to specific embodiments it is obvious that other embodiments are included within the object and the scope of the invention, being this invention only limited by the claims that follow:

What is claimed is:

1. A system for the repair or reinforcement of a conduit, said system comprising:
   a casing having a dimension to envelope a damaged portion of said conduit, said dimension being such that a space is defined between an inner surface of said casing and an outer periphery of said conduit;
   an injection port for providing an injectable material to said space, said injection port being positioned along said casing and in selective communication with said space;
   a cap assembly frictionally attached to said casing via an anchor element having a head portion and a shaft;
   wherein said shaft of said anchor element, including its distal end, is entirely embedded in one of said cap assembly and said casing, when said cap assembly is frictionally attached to said casing.

2. The system for the repair or reinforcement of a conduit according to claim 1, wherein:
said casing is comprised of two complimentary portions.

3. The system for the repair or reinforcement of a conduit according to claim 1, wherein:
said casing has a geometry configured to accommodate said damaged portion of said conduit.

4. The system for the repair or reinforcement of a conduit according to claim 1, wherein:
said injectable material is comprised of one of a polymer and a copolymer resin.

5. The system for the repair or reinforcement of a conduit according to claim 1, further comprising:
a sealing element in communication with said cap assembly and said casing.

6. The system for the repair or reinforcement of a conduit according to claim 1, wherein:
said injectable material thermally isolates said casing from said conduit.

7. A casing system for a conduit, said casing system comprising:
a casing for selectively enveloping a portion of said conduit;
a cap assembly selectively attached to said casing and said conduit via screw members, said screw members including a shaft having a frictionally attractive threaded portion; and
wherein an entirety of said shaft of said screw members are wholly embedded in one of said cap assembly and said casing when said cap assembly is attached to said casing, said entirety of said shaft of said screw members, including a distal end portion of said shaft, being thereby protected from surrounding ambient environments.

8. A reinforcement assembly for a conduit, said reinforcement assembly comprising:
a casing for selectively enveloping a portion of said conduit;
a cap assembly selectively attached to each opposing end of said casing via screw elements, said screw elements including a shaft defining a frictionally attractive thread formed thereon; and
wherein a distal end of said shaft of said screw members is wholly embedded in one of said cap assembly and said casing when said cap assembly is attached to said casing.

9. A reinforcement assembly for a fluid carrying conduit pipe in an aquatic environment, said reinforcement assembly comprising:
a casing for selectively enveloping a portion of said conduit;
a cap assembly selectively attached to each opposing end of said casing via a fastening element, said fastening element including a threaded shaft; and
wherein said threaded shaft of said fastening element is wholly embedded in one of said cap assembly and said casing when said cap assembly is attached to said casing, thereby isolating said threaded shaft from said aquatic environment.

* * * * *